US011082745B2

(12) United States Patent
Poder et al.

(10) Patent No.: US 11,082,745 B2
(45) Date of Patent: Aug. 3, 2021

(54) INTERNET PROTOCOL (IP) TO VIDEO-ON-DEMAND (VOD) GATEWAY

(71) Applicant: Comcast Cable Communications, LLC, Philadelphia, PA (US)

(72) Inventors: Jim Poder, Cheltenham, PA (US); Michael J. Cook, Flemington, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/453,002

(22) Filed: Jun. 26, 2019

(65) Prior Publication Data

US 2019/0320232 A1    Oct. 17, 2019

Related U.S. Application Data

(63) Continuation of application No. 15/171,751, filed on Jun. 2, 2016, now abandoned, which is a continuation
(Continued)

(51) Int. Cl.
*H04N 21/2225* (2011.01)
*H04N 21/472* (2011.01)
(Continued)

(52) U.S. Cl.
CPC ... *H04N 21/47202* (2013.01); *H04L 12/2801* (2013.01); *H04L 12/4633* (2013.01);
(Continued)

(58) Field of Classification Search
None
See application file for complete search history.

(56) References Cited

U.S. PATENT DOCUMENTS 6,275,536 B1  8/2001  Chen et al.
6,484,210 B1  11/2002  Adriano et al.
(Continued)

FOREIGN PATENT DOCUMENTS

EP    1372297 A2    12/2003
EP    2000915 A2    12/2008
(Continued)

OTHER PUBLICATIONS

Jung-Tae Kim et al: "Implementation of the DLNA Proxy System for Sharing Home Media Contents". IEEE Transactions on Consumer Electronics. IEEE Service Center. New York. NY, US, vol. 53, No. 1, Feb. 1, 2007 (Feb. 1, 2007), pp. 139-144, XP011175933, ISSN: 0098-3063, DOI: 10.1109/TCE.2007.339520.
(Continued)

*Primary Examiner* — Cai Y Chen
(74) *Attorney, Agent, or Firm* — Banner & Witcoff, Ltd.

(57) ABSTRACT

A media server is hosted in a service provider's network so that media content can be stored from or rendered to a private network such as a Digital Living Network Alliance network. Media content may be stored by accessing the media server or by downloading the media content to the media server. Support of set top boxes interacting with voice-on-demand (VOD) controllers and computers interacting with IP-based video content servers are integrated through the media server. Consequently, VOD assets can be played on IP-based devices and IP-based content can be played on set top boxes. A gateway function converts IP-based content to a VOD asset, and renders the VOD asset to a set top box while mapping digital rights management information for the VOD asset. Conversely, the gateway function may convert a VOD asset to IP-based content that can be played on an IP-based device.

20 Claims, 13 Drawing Sheets

Related U.S. Application Data of application No. 12/435,059, filed on May 4, 2009, now abandoned.

(51) Int. Cl.

| | |
|---|---|
| *H04N 21/436* | (2011.01) |
| *H04N 21/61* | (2011.01) |
| *H04N 21/643* | (2011.01) |
| *H04N 21/231* | (2011.01) |
| *H04N 21/222* | (2011.01) |
| *H04N 21/2343* | (2011.01) |
| *H04N 21/6405* | (2011.01) |
| *H04L 12/28* | (2006.01) |
| *H04L 12/46* | (2006.01) |
| *H04L 29/12* | (2006.01) |
| *H04L 29/06* | (2006.01) |

(52) U.S. Cl.
CPC ........ *H04L 61/103* (2013.01); *H04L 65/1069* (2013.01); *H04N 21/2221* (2013.01); *H04N 21/2225* (2013.01); *H04N 21/2343* (2013.01); *H04N 21/23106* (2013.01); *H04N 21/43615* (2013.01); *H04N 21/6118* (2013.01); *H04N 21/6125* (2013.01); *H04N 21/6405* (2013.01); *H04N 21/64322* (2013.01)

(56) References Cited

U.S. PATENT DOCUMENTS

| | | | |
|---|---|---|---|
| 6,981,045 | B1 | 12/2005 | Brooks |
| 8,078,665 | B2 | 12/2011 | Poder et al. |
| 8,190,706 | B2 | 5/2012 | Poder et al. |
| 8,190,751 | B2 | 5/2012 | Poder et al. |
| 8,438,210 | B2 | 5/2013 | Poder et al. |
| 8,689,265 | B2 | 4/2014 | Lockett et al. |
| 2001/0027491 | A1 | 10/2001 | Terretta et al. |
| 2001/0042107 | A1 | 11/2001 | Palm |
| 2002/0083006 | A1 | 6/2002 | Headings et al. |
| 2002/0116501 | A1 | 8/2002 | Ho et al. |
| 2002/0116721 | A1 | 8/2002 | Dobes et al. |
| 2002/0141389 | A1 | 10/2002 | Fangman et al. |
| 2002/0144283 | A1 | 10/2002 | Headings et al. |
| 2003/0118014 | A1* | 6/2003 | Iyer .................... H04N 21/4334 370/389 |
| 2003/0126086 | A1 | 7/2003 | Safadi |
| 2004/0172658 | A1 | 9/2004 | Rakib et al. |
| 2004/0231000 | A1 | 11/2004 | Gossalia et al. |
| 2005/0198130 | A1 | 9/2005 | Bosloy et al. |
| 2005/0251827 | A1* | 11/2005 | Ellis .................... H04N 21/4532 725/47 |
| 2006/0112192 | A1 | 5/2006 | Stewart et al. |
| 2006/0159109 | A1 | 7/2006 | Lamkin et al. |
| 2006/0182103 | A1 | 8/2006 | Martini et al. |
| 2006/0259575 | A1 | 11/2006 | Upendran et al. |
| 2007/0115975 | A1 | 5/2007 | Zhang |
| 2007/0130601 | A1 | 6/2007 | Li et al. |
| 2007/0157260 | A1 | 7/2007 | Walker |
| 2007/0168458 | A1 | 7/2007 | Costa-Requena et al. |
| 2007/0211734 | A1 | 9/2007 | Yang et al. |
| 2007/0217436 | A1 | 9/2007 | Markley et al. |
| 2007/0237115 | A1 | 10/2007 | Bae et al. |
| 2007/0250870 | A1 | 10/2007 | Kim et al. |
| 2008/0118227 | A1 | 5/2008 | Barton |
| 2008/0235358 | A1* | 9/2008 | Moribe ............. H04L 29/12405 709/220 |
| 2008/0250461 | A1* | 10/2008 | Tanaka ............. H04N 21/47202 725/74 |
| 2009/0094317 | A1 | 4/2009 | Venkitaraman |
| 2009/0144338 | A1 | 6/2009 | Feng et al. |
| 2009/0164550 | A1 | 6/2009 | Rahrer et al. |
| 2009/0265443 | A1 | 10/2009 | Moribe et al. |
| 2009/0292738 | A1 | 11/2009 | Hurwitz |
| 2010/0061309 | A1 | 3/2010 | Buddhikot et al. |
| 2010/0180037 | A1 | 7/2010 | Dessart |
| 2010/0251384 | A1 | 9/2010 | Yen |
| 2010/0281093 | A1 | 11/2010 | Poder et al. |
| 2010/0281174 | A1 | 11/2010 | Poder et al. |
| 2010/0281508 | A1 | 11/2010 | Poder et al. |
| 2010/0281534 | A1 | 11/2010 | Poder et al. |
| 2010/0325695 | A1 | 12/2010 | Suzuki |
| 2011/0066844 | A1 | 3/2011 | O'Toole, Jr. |
| 2012/0047196 | A1 | 2/2012 | Poder et al. |

FOREIGN PATENT DOCUMENTS

| | | |
|---|---|---|
| EP | 2000917 A1 | 12/2008 |
| WO | 2008090519 A2 | 7/2008 |

OTHER PUBLICATIONS

"IPTV service requirements and framework for secondary distribution; J.700 (Dec. 2007)", ITU-T Standard, International Telecommunication Union, Geneva; CH, No. J.700 (Dec. 2007), Dec. 14, 2007 (Dec. 14, 2007), XP017434000.

Oh Y-J et al: "The DLNA Proxy System Architecture for Sharing In-Home Media Contents via Internet", International Conference on Advanced Communication Technology, XX, XX, vol. 6, Feb. 20, 2006 (Feb. 20, 2006), pp. 1855-1858, XP003017690.

Yeon-Joo Oh et al: "Design of an Extended Architecture for Sharing DLNA Compliant Home Media from Outside the Home", IEEE Transactions on Consumer Electronics, IEEE Service Center, New York, NY, US, vol. 53, No. 2, May 1, 2007(May 1, 2007), pp. 542-547, XP011186775, ISSN: 0098-3063, DOI: 10.1109/TCE.2007.381727.

Hyunyong Lee et al: "An Approach for Content Sharing among UPnP Devices in Different Home Networks", IEEE Transactions on Consumer Electronics, IEEE Service Center, New York, NY, US, vol. 53, No. 4, Nov. 1, 2007 (Nov. 1, 2007), pp. 1419-1426, P011199912, ISSN: 0098-3063, DOI: 10.1109/TCE.2007.4429232.

Shinji Motegi et al: "Proposal on Wide Area DLNA Communication System", Consumer Communications and Networking Conference, 2008. CCNC 2008. 5th IEEE, IEEE CCP, Piscataway, NJ, USA, Jan. 1, 2008 (Jan. 1, 2008), pp. 233-237, XP031211868, ISBN: 978-1-4244-1456-7.

Narayanan Venkitaraman Ed-Hao Luan et al: "Wide-Area Media Sharing with UPnP/DLNA", Consumer Communications and Networking Conference, 2008. CCNC 2008. 5th IEEE, IEEE CCP, Piscataway, NJ, USA, Jan. 1, 2008 (Jan. 1, 2008), pp. 294-298, XP031211881, ISBN: 978-1-4244-1456-7.

Marusic Bet Al: "TIRAMISU: A novel approach to content representation and key management for seamless super-distribution of protected media", Signal Processing. Image Communication; Elsevier Science Publishers, Amsterdam, N L, vol. 20, No. 9-10, Oct. 1, 2005 (Oct. 1, 2005), pp. 947-971, XP025323812, ISSN: 0923-5965, DOI: 10.1016/J.IMAGE.2005.04.004 [retrieved on Oct. 1, 2005].

Taein Hwang et al: "Personal Mobile AN Control Point for Home-to-Home Media Streaming". IEEE Transactions on Consumer Electronics, IEEE Service Center, New York, NY, US, vol. 54. No. 1, Feb. 1, 2008 (Feb. 1, 2008), pp. 87-92, XP011225507, ISSN: 0098-3063, DOI: 10.1109/TCE.2008.4470028.

Extended European Search Report—EP10160947.7—dated Dec. 19, 2012.

European office action for application No. 10159921.5 dated Jan. 24, 2012.

European office action for application No. 10157953.0 dated Aug. 18, 2011.

European Office Action for application No. 10159921.5 dated Jun. 17, 2011.

European Search Report from Related EP Application No. 10157953, dated Aug. 16, 2010, pp. 1-11.

Wen, Chih-Chao et al., "Centralized Control and Management Architecture Design for PIM-SM Based IP/MPLS Multicast Networks," IEEE, 2007, pp. 443-447.

European Search Report from Related EP Application No. 10157939, dated Aug. 16, 2010, pp. 1-11.

(56) References Cited

OTHER PUBLICATIONS

Gleeson, B. et al, "A Framework for IP Based Virtual Private Networks," Feb. 2000, pp. 1-63, The Internet Society.
Fasbender, Andreas et al., "Virtually at home: High-performance access to personal media," 2008, pp. 58-63, Ericsson Review No. 2.
Extended European Search Report from Related EP Application No. 10159921.5, dated Jun. 22, 2010, pp. 1-2.
European Office Action—EP 10160947.7—Dated Jul. 13, 2015.
Response to European Office Action—EP Application 10160947.7—submitted Nov. 4, 2015.
Canadian Office Action—CA Appl. 2,697,704—dated Feb. 18, 2016.
European Office Action—EP Appl. 10160947.7—dated Mar. 23, 2016.
CA Office Action—App 2,699,548—May 26, 2016.
European Search Report—EP App. 16165678.0—dated Jul. 15, 2016.
CA Office Action—App 2,699,548—dated Jan. 18, 2017.
EP Summons to Oral Proceedings—EP Application No. 10160947.7—dated Feb. 17, 2017.
Caron, Francois et al—"A Transcoding Server for the Home Domain"—Portable Information Devices (IEEE)—May 1, 2007.
Feb. 2, 2018—Canadian Office Action—CA 2,699,548.
Jan. 3, 2019—Canadian Office Action—CA 2,699,548.
Oct. 16, 2020, Canadian Office Action, CA 2,699,548.

\* cited by examiner

INTERNET PROTOCOL (IP) TO VIDEO-ON-DEMAND (VOD) GATEWAY

CROSS REFERENCE TO RELATED APPLICATIONS

This application claims the benefit of, and is a continuation of U.S. application Ser. No. 15/171,751, entitled "Internet Protocol (IP) To Video-On-Demand (VOD) Gateway" and filed Jun. 2, 2016, which is a continuation of U.S. application Ser. No. 12/435,059, entitled "Internet Protocol (IP) To Video-On-Demand (VOD) Gateway" and filed May 4, 2009. The contents of the above listed application are expressly incorporated herein by reference in their entirety for any and all non-limiting purposes.

TECHNICAL FIELD

Aspects relate to storing and rendering media content from a media server. More specifically, the media server may be located in a service provider's network and may implement protocols compliant with a Digital Living Network Alliance (DLNA).

BACKGROUND

Consumers are acquiring, managing and using digital media on multiple consumer electronic devices. Network media sources include a service provider's legacy video plant, the Internet, retail rental locations (physical DVDs), and the home network. A home network typically has consumer electronics (CE) devices such as set top boxes, DVD players, personal computers (PCs), game consoles, portable media devices, and mobile phones. Standards are evolving for content delivery, in which content portability may be achieved and made interoperable through the use of compatible devices and other video internetworking technologies. For example, the Digital Living Network Alliance (DLNA) is an international, cross-industry collaboration of consumer electronics, computing industry and mobile device companies. Members of DLNA develop a concept of wired and wireless interoperable networks where digital content such as photos, music, and videos can be shared through consumer electronics, PCs, and mobile devices in and beyond the home. The organization seeks to deliver an interoperability framework and design guidelines that become open industry standards. Current guidelines expand the capabilities of the DLNA-defined network to include more device classes and functional capabilities, including printers, mobile devices, controllers, uploaders and downloaders. The guidelines also include specifications for digital rights management.

With traditional systems, DLNA media servers (DMS) are co-resident to DLNA media players in the local network that is typically located on the customer's premises. Media content is often stored in the Internet and may not be protected by a high level of security. Media content from the Internet sources may be downloaded to a PC in order for the PC to provide the media content from a DLNA media server to other DLNA media players in the DLNA network.

Personalized services, e.g., storage of the media content and the administration of DLNA media and server capability, are typically the responsibility of the customer in the local network. However, many customers do not have a technical background and may find this responsibility difficult and burdensome. Also, playing this media content on other media players (e.g., televisions and portable media players (PMPs)) may require more hardware or software support in the home as it requires a local DLNA media server at the customer's home. Moreover, media content is often copied to a physical storage device each time the media content is shared with a user in the DLNA network. This may increase the cost to the customer and may require supporting a variety of physical storage devices.

BRIEF SUMMARY

The following presents a simplified summary of the disclosure in order to provide a basic understanding of some aspects of the disclosure. It is not intended to identify key or critical elements of the embodiments or to delineate the scope of the embodiments. The following summary merely presents some concepts of the disclosure in a simplified form as a prelude to the more detailed description provided below.

A media server is hosted in a service provider's network so that media content can be stored from or rendered to a private network such as a Digital Living Network Alliance (DLNA) network. Media content may be stored directly by accessing the media server or by downloading the media content to the virtual media server. The media server may support discovery of media content in a local DLNA network, media content fulfillment from a service provider network, and content delivery for a device on the DLNA network.

Support of set top boxes interacting with voice-on-demand (VOD) controllers and computers interacting with IP-based video content servers are integrated through the media server. Consequently, VOD assets can be played on IP-based devices and IP-based content can be played on set top boxes.

A gateway function that may be implemented within the media server to convert IP-based content to a video-on-demand (VOD) asset, and to render the VOD asset to a set top box. Digital rights management (DRM) and/or personal rules for accessing the IP-based content may be mapped for the VOD asset. Conversely, the gateway function may convert a VOD asset to IP-based content that can be played on an IP-based device while mapping digital rights management information and personal rules.

Other embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the embodiments will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

While traditional systems separately support set top boxes interacting with voice-on-demand (VOD) controllers and computers interacting with IP-based video content servers (e.g., Fancast), system 100, as will be discussed, integrates the above two environments together. Consequently, VOD assets can be played on IP-based devices and IP-based content can be played on set top boxes.

Figure 1:
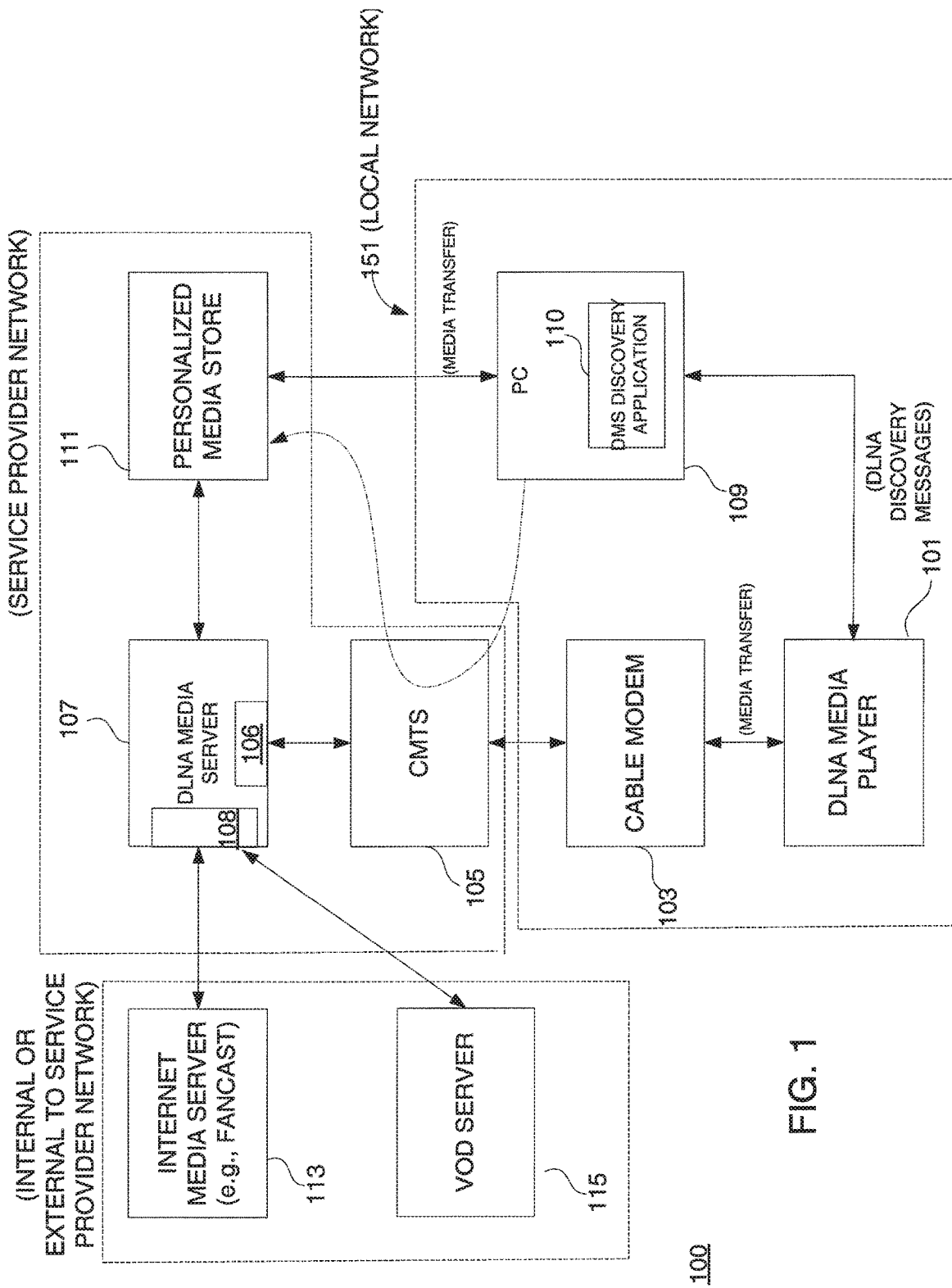
FIG. 1 illustrates a system with a media server that appears as a local media server in accordance with various aspects of the disclosure.

FIG. 1 shows a system 100 that supports a network such as a Digital Living Network Alliance (DLNA) network. DLNA published its first set of Interoperability Guidelines in June 2004 and the first set of DLNA Certified products began appearing in the market soon thereafter. DLNA Interoperability Guidelines, version 1.5, was published in March 2006, and then expanded in October 2006. These guidelines enlarge the capabilities of a DLNA-defined network to include more home and mobile devices. They also include the specifications for link protection to allow secure transmission of copyright-protected commercial digital content. Products are certified by passing the DLNA Certification Program. However, embodiments are not limited to version 1.5 of the DLNA Interoperability Guidelines.

DLNA media server 107 appears as a local media server in accordance with various aspects of the disclosure. While a DLNA media server is typically hosted at the customer (user) premises in accordance with traditional systems, DLNA media server 107 is hosted in the service provider network such as a cable network. Media server 107 may host all the personal media content for a user associated with the DLNA network, where media content may be uploaded directly from a device on the DLNA network by the user. Media server 107 may also connect to network media sources.

Figure 4:
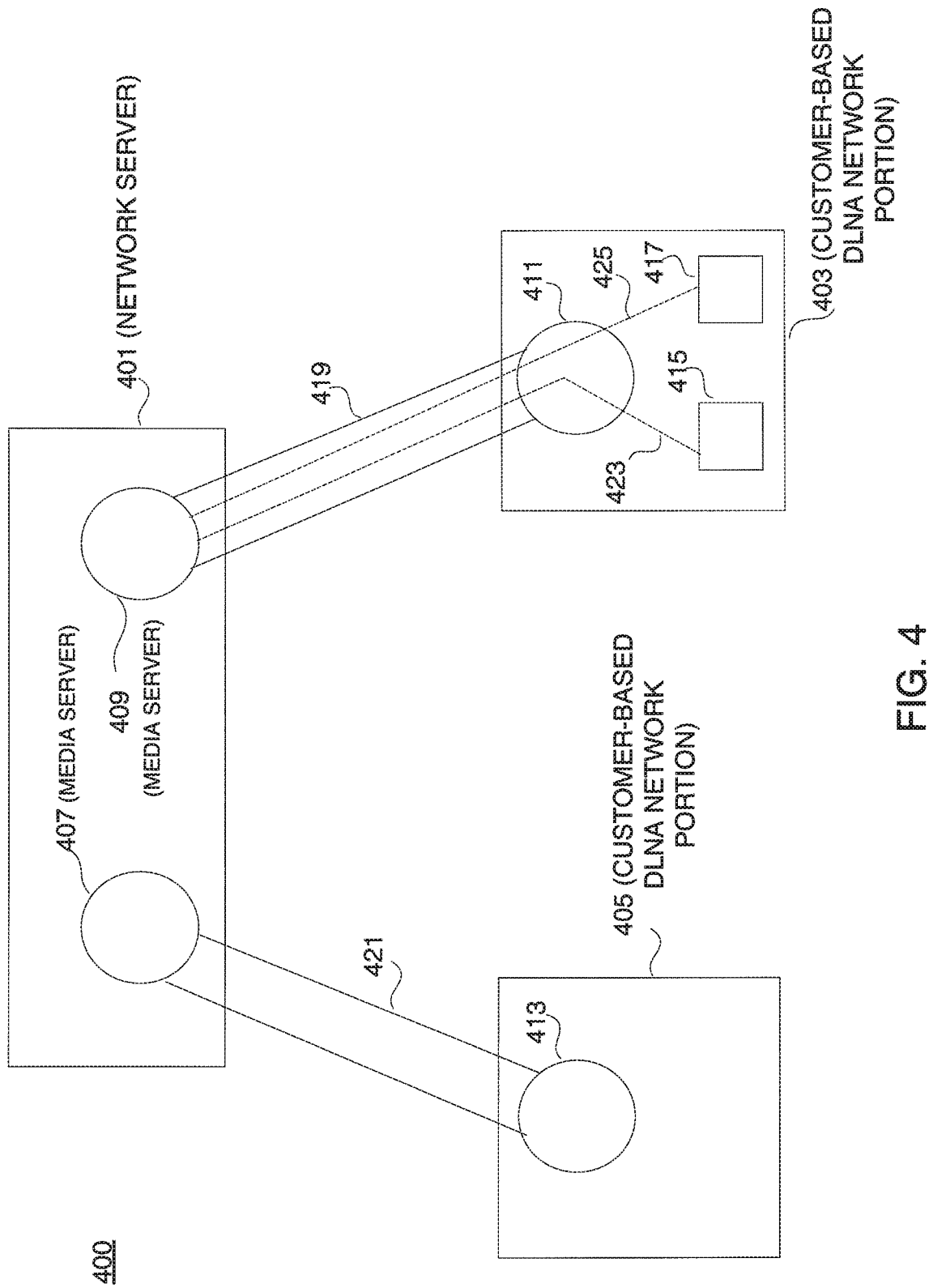
FIG. 4 shows a system with a network server supporting a plurality of DLNA networks in accordance with aspects of the disclosure.

As will be discussed, a hardware entity (e.g., network server 401 as shown in FIG. 4) typically supports a plurality of users in the service provider network, where each customer is associated with either a separate or virtual media server 107. Media server 107 may be referred to as a virtual media server because the media server appears to the devices on the user's physical LAN to be located in the user's private network, as will be discussed. Address mapping module 106 converts the physical address associated with media server 107 to a virtual address that is associated with a private network of the customer so that media server appears to be located within the private network (e.g., a DLNA network). For example, as will be discussed, a tunnel may be established between physical addresses while one or more sessions may be established within the tunnel using the virtual addresses.

With various aspects of the disclosure, a portion of the DLNA network is associated with the customer premises. The customer-based portion typically includes various DLNA devices, e.g., computer (PC) 109 and media player 101, as well as a local router (not explicitly shown in FIG. 1 but shown as router 307 in FIG. 3) that routes messages between the DLNA devices. With some embodiments, the local router may be where the tunnel between the physical device 106 and the local network 151 is terminated in the user's network.

With an embodiment, media server 107 is discovered through discovery application 110, which is typically implemented in the local network. Content fulfillment from the provider network and content delivery may occur through an existing cable infrastructure (e.g., cable modem termination system CMTS 105 and cable modem 103).

CMTS 105 is equipment typically found in a cable company's head-end (not shown) or at a cable company hub-site. CMTS 105 typically provides high speed data services, e.g., cable internet or Voice over IP (VoIP), to cable subscribers. In order to provide these high speed data services, a cable company often connects its head-end to the Internet via very high capacity data links to a network service provider. On the subscriber side of the network, CMTS 105 enables communication with subscribers' cable modems. Different CMTSs are typically capable of serving different cable modem population sizes ranging from 4,000 cable modems to 150,000 or more, depending in part on the amount of traffic.

A given head-end may be associated with a dozen or more CMTSs to service the cable modem population served by that head-end or hybrid fiber coax (HFC) hub. CMTS 105 typically functions as a router with Ethernet interfaces (connections) on one side and coax RF interfaces on the other side. The RF/coax interfaces may carry RF signals to and from cable modem 103. CMTS 105 typically supports high-speed data interfaces as well as RF interfaces. Consequently, traffic that is coming from the Internet (e.g., from Internet media server 113) may be routed (or bridged) through an Ethernet interface, through CMTS 105, and then onto the RF interfaces to cable modem 103.

With network-based hosting of media server 107, media content between an IP network and a broadcast network may be shared as will be further discussed. With media server 107 hosted in the provider network, media server 107 may store the personal media content of the user at personalized media store 111. The media content may be stored directly by the user by accessing server 107 securely or by downloading the media content from an external IP source (e.g., a Fancast server, which can be accessed at www.fancast.com) to media server 107. For example, a service provider (e.g., Comcast.net) may allow a personalized web page for each of its customers, and the media content may be uploaded and categorized to the web page.

Media server 107 provides media content for a private network that is separate from the media content for another private network. For example, as shown in FIG. 4, media content for media server 407 is separately stored from media content for media server 409, in which each media server is associated with different private networks. Consequently, media server 107 may be implemented as a disaggregated DLNA media server for supporting remote fulfillment, in which media content for a private network may be locally discovered. Discovery of media server 107 and announcing of content is typically implemented within the local network (e.g., discovery application 110). This approach may reduce the number of router hops and reduce the round trip delay time during the discovery process. With some embodiments, proper operation of DLNA-compatible devices may require that DLNA discovery messages be routed with a maximum of 3 router hops and a maximum of 7 msec round trip delay time. Also, multicast messages typically are not routed from media server 107 to the local network through CMTS 105 and cable modem 103. During the DLNA discovery process, local DMS application 110 publishes the URL of media server 107 as the URL for the media content.

Some embodiments may utilize Universal Plug and Play (UPnP) to allow DLNA devices to connect seamlessly and to implement a DLNA network in the home (data sharing, communications, and entertainment) or in a corporate environment.

UPnP networking is typically based on IP addressing. Each DLNA device has a Dynamic Host Configuration Protocol (DHCP) client and searches for a DHCP server when the device is first connected to the network. If no DHCP server is available (the network is unmanaged), the DLNA device assigns itself an address. If during the DHCP transaction, a DLNA device obtains a domain name through a DNS server or via DNS forwarding, the DLNA device may use that name in subsequent network operations; otherwise, the device should use its IP address.

Given an IP address, UPnP networking further supports a discovery process. When a DLNA device is added to the network, the UPnP discovery protocol allows a DLNA device to advertise its services to control points on the network. Similarly, when a control point is added to the network, the UPnP discovery protocol allows the control point to search for devices of interest on the network. The discovery utilizes discovery messaging that may contain a device's type, identifier, and a pointer to more detailed information.

A media player (e.g., DLNA media player 101) may use the media server's URL as the destination URL and may communicate with media server 107 for the media content. Media server 107 may provide connectivity to existing media store (e.g., personalized Comcast.net web page) or implement a media store (e.g., personalized media store 111).

Although not explicitly shown, messaging between devices in a DLNA network is typically routed through a local router.

Media server 107 may connect to Internet media server 113 (e.g., a Fancast server) using Internet Protocol for content rendering over IP connectivity to CMTS 105 to share media content with downstream media players (e.g., player 101 and PC 109). With some embodiments, media server 107 may make requests of Internet media server 113 using standard web interface requests (e.g., appearing as a PC requesting content using SOAP/XML). Media server 107 then proxies the data for the player 101. Initially, media server 107 may request the catalog of content from Internet media server 113, and may present that over interface 106 using standard UPnP messages annunciating content. Media server 107 may also support additional functionality, including session management for cable modem 103, transcoding media content to an appropriate format (e.g., MPEG 2 or MPEG 4) as required by a DLNA media player, and digital rights management (DRM) for playing the content on a downstream player (e.g., Digital Transmission Content Protection over Internet Protocol (DTCP-IP)).

Media content downloading from Internet media server 113 may be supported by exporting an interface (e.g., from Fancast to the DLNA media server 107). An exemplary embodiment incorporates a web service API with Simple Object Access Protocol (XML protocol) (SOAP/XML) format to connect to the DLNA media server 107 from Internet media server 113. DLNA media server 107 may query Internet media server 113 for the media content and cache media content with an expiry timer.

With other embodiments, alternative options implement Remote Method Invocation (RMI) using a Common Object Request Broker Architecture (CORBA) on the Fancast server 113, SQL queries from media server 107 to a database associated with Internet media server 113, or screen scraping of a website that is associated with Internet media server 113.

Media content from Internet media server 113 through media server 107 may be supported with various real-time protocols including Real Time Streaming Protocol (RTSP). RTSP allows a user to remotely control a streaming media server with VCR-like commands and allows time-based access to files on media server 107.

Figure 3:
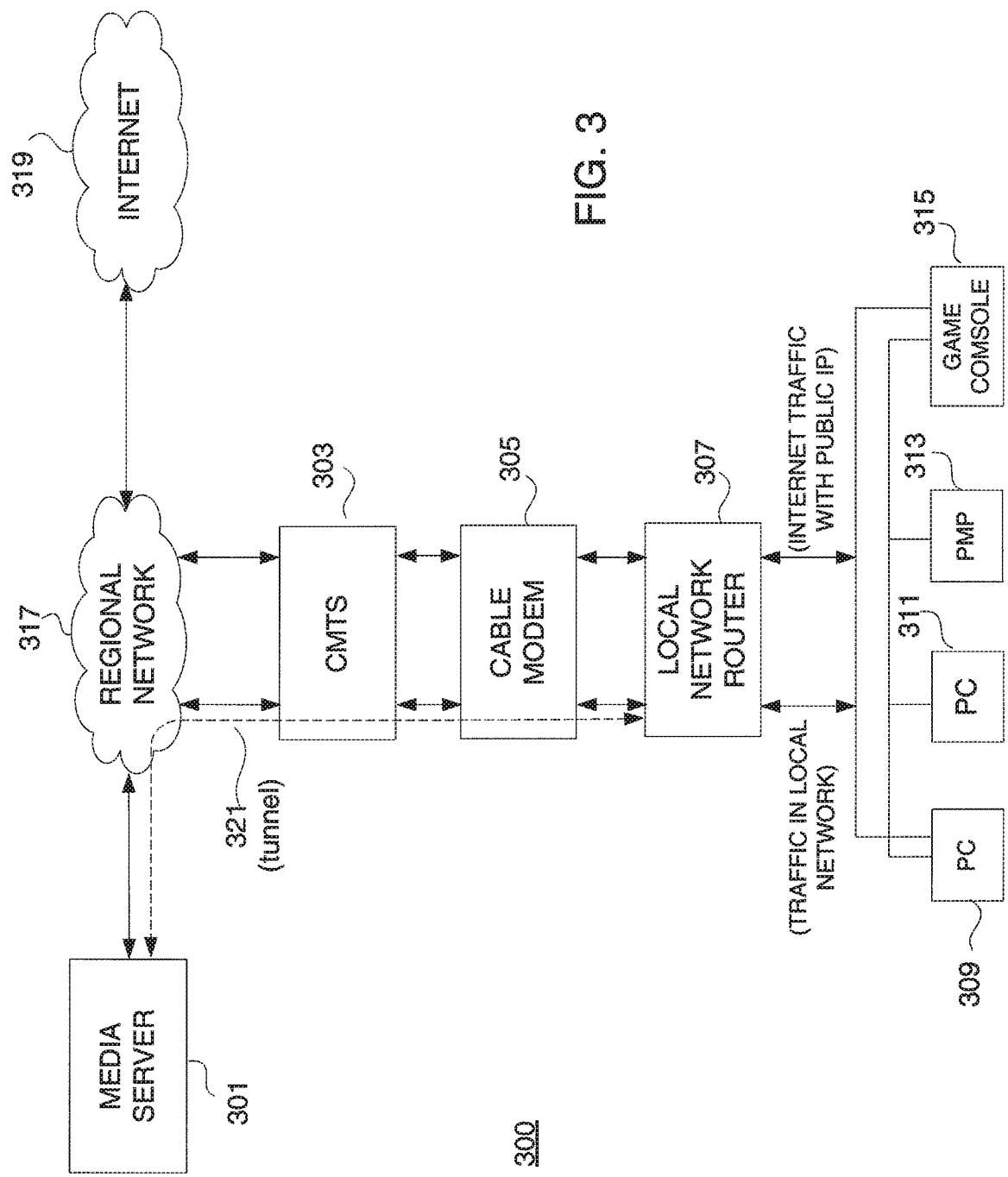
FIG. 3 shows a system in a network with tunneling flow in accordance with various aspects of the disclosure.

A communication channel (e.g., tunnel 321 as shown in FIG. 3) can be uniquely established from local (home) network 151 to DLNA media server 107. From the customer (end user) perspective, only one media server connects to Internet media server 113. Caching and data transfer may be maintained to provide the same user experience as that of directly connecting to Internet media server 113 or to media store 111.

System 100 may include a video on demand (VOD) server 115 to support an IP to VOD gateway application residing on a DLNA media server 107.

System 100 may be advantageous over traditional systems because additional DLNA media servers may not be needed at local network 151 (customer premises). For example, customers may buy devices with DLNA players built into them but may not have a DLNA server to access or content they wish to view in their home network. System 100 may a way for someone to have the service provider "do it for me" without having to purchase additional equipment or spend time building configuring. Personal media content is stored in the provider network media store, thus removing the need for a local storage in local network 151. Media content from Internet media server 113 and other personal media content may be directly downloaded to an IP-enabled DLNA media player because transcoding is performed by transcoder module 108 in the upstream network. Also, transcoder module 108 may perform transcoding so that IP media content may be delivered as a video on demand (VOD) through a set top box (not shown). Conversely, transcoder module 180 may perform transcoding so that a VOD media file (VOD asset) is delivered to an IP-compatible device.

Transcoder module 108 converts the format of a media file or streamed file format into an appropriate format so that a target device can properly play the converted media file based on characteristics of the target device (e.g., resolution and color display capability). Transcoder module 108 may convert video formats (i.e., MPEG-2 to MPEG-4, VHS to QuickTime, QuickTime to MPEG). Also, transcoder module 108 may be used to fit HTML files and graphics files to the unique constraints of mobile devices and other Web-enabled products. Mobile devices often have smaller screen sizes, lower memory, and slower bandwidth rates. Transcoding may entail (changing file formats as previously discussed), transrating (lowering the screen resolution or frames per second to meet the capabilities of the player), and re-encrypting content. With some embodiments, requests made of the VOD server 115 may be of a proprietary protocol, but the Media Server 107 may know how to interface with that server and start and stream control content.

According to aspects of the disclosure, a media server (e.g., media server 107) may execute computer executable instructions from a computer-readable medium. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a processor.

Figure 2:
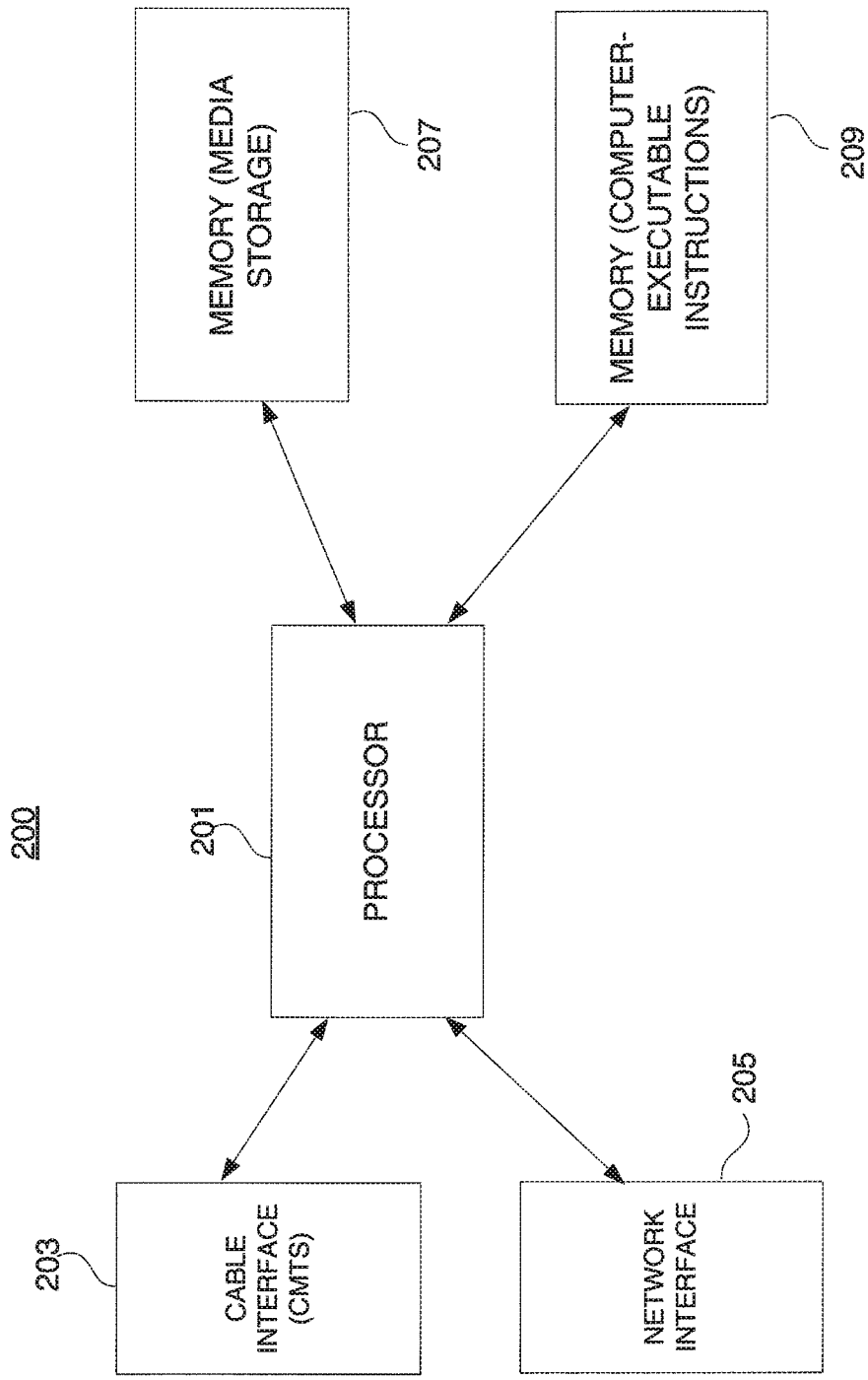
FIG. 2 shows an apparatus that supports a media server in accordance with various aspects of the disclosure.

FIG. 2 shows apparatus 200 that supports a media server in accordance with aspects of the disclosure. With some embodiments, apparatus 200 comprises a computer platform (e.g., network server 401 as shown in FIG. 4) that supports numerous media servers (e.g., media server 107), where each media server is associated with a corresponding private network.

Apparatus 200 interfaces to an external or internal network (shown including Internet media server 113 and VOD server 115 in FIG. 1) via network interface 205 typically with the Internet Protocol and cable interface 203 that communicates with supported private networks through CMTS 105.

Processor 201 provides functionalities associated with media server 107, as previously discussed, including transformation (e.g., transcoding) of media content and conversion of physical addresses to virtual addresses so that a virtual address appears to be local within a private network.

Processor 201 may execute computer executable instructions from a computer-readable medium, e.g., memory 209. Computer storage media may include volatile and nonvolatile, removable and non-removable media implemented in any method or technology for storage of information such as computer readable instructions, data structures, program modules or other data.

Apparatus 200 also includes memory 207 for storing media content. Even though personal media content may be stored in the service provider's network, the media content appears to be locally stored and discovered in the private network that is associated with the media server.

FIG. 3 shows system 300 in a network with tunneling flow in accordance with various aspects of the disclosure. System 300 hosts personalized server (media server) 301 in a service provider network (comprising local network router 307, cable modem 305, and CMTS 303) and connects the network with the user's local network (comprising PC 309, PC 311, portable media player (PMP) 313, and game console 315) by making the server IP address appear to be in the local network.

A communications channel may be established between media server 301 (which may be one of a plurality of media servers supported by apparatus 200) to a private network (e.g., local network 151 as shown in FIG. 1) through an Ethernet interface to CMTS 303. Consequently, CMTS 303 typically supports a coax RF connection to cable modem 305. With some embodiments, a L2TP communication tunnel may be established between media server 301 (or some sort of security endpoint in front of media server 301) and cable modem 305.

Media server 301 may be hosted in the upstream network 317 and connects with the corresponding user's local network. In a cable network, cable modem 305 is typically at the customer premises and provides the public IP for the local network. The local network is typically a private network with private IP addresses, which are not routable outside of the network.

With traditional systems, other IP enabled devices in the local network cannot communicate with any personalized servers (e.g., server 301) in the network cloud. The private IP addresses of devices 309, 311, 313, and 315 are routable within the private network only and routed to external networks via the cable modem's public IP address and by performing network address translation. Personalized services (e.g., storage of the media, the DLNA Media server capability, and so forth) with traditional systems are controlled and maintained by the user in the local network. Because personalized services are typically available only through the public Internet, it may be difficult to offer services which require processing of multicast messages for a DLNA network. Traditional cable networks typically do not route the multicast messages originated from a private network.

A network connection from local network devices to server 301 is supported so as to render various personalized services to the user. As will be further discussed, media server 301 appears to devices 309, 311, 313, and 315 to be in the local network by mapping physical addresses to virtual addresses. For example, server 301 may be assigned a physical IP address (e.g., 180.180.180.180) while the associated virtual address is within the virtual address space of the DLNA network. For example, media server 301 may have a physical IP address of 180.180.180.180 while the corresponding virtual address is 150.150.150.150, which is within the virtual address space of the DLNA network. The virtual address of media server 301 may be within an address range associated with cable modem 305. Continuing the example, the virtual addresses of devices 309, 311, 313, and 315 are 150.150.150.151, 150.150.150.152, 150.150.150.153, and 150.150.150.154, respectively. Devices 309, 311, 313, and 315 and server 301 can communicate with each other using the virtual addresses so that media server 301 appears to be local within the DLNA network.

The translation of physical to virtual addresses can be performed by processor 201, in which tunnel 321 is established between media server 301 and either cable modem 305 or local network router 307, which corresponds to an endpoint in local network 151 (as shown in FIG. 1). Embodiments can support different endpoints in a private network, including cable modem 305, local network router 307, or PC 309. Once tunnel 321 has been established, a session may be established where media server 301 is associated with a virtual address that is within the address space of cable modem 305.

In order to decrease delay times and to reduce the number of router hops, tunnel 321 is established between an endpoint in the DLNA network (e.g., local network router 307) and media server 301. Embodiments may establish a tunnel to different endpoints, including network PC 311 or cable modem 303, by using the physical addresses. Once tunnel 321 has been established, one or more sessions may be established within tunnel 321 using virtual addresses as will be further discussed. With some embodiments, establishing the tunnel is performed by using the L2TP protocol. The virtual address of the media server 301 is requested of the local router 307 after the L2TP tunnel is established.

FIG. 4 shows a system 400 with network server 401 supporting DLNA networks 403 and 405 in accordance with aspects of the disclosure. Network server 401 may be implemented as a server platform supporting numerous media servers (e.g., media servers 407 and 409), where each media server corresponds to a private network (e.g., a DLNA network). In order to extend the DLNA network to a media server, each DLNA network establishes a tunnel to the corresponding media server, where tunnel 419 corresponds to endpoint 411 and media server 409 and tunnel 421 corresponds to endpoint 413 and media server 407.

Once a tunnel has been established, one or more sessions may be established between a DLNA device and the corresponding media server using virtual addresses. For example, sessions 423 and 425 are established for devices 415 and 417, respectively, with media server 409.

Embodiments may use different protocols in order to establish tunnel 419. For example, embodiments may use Layer 2 Tunneling Protocol (L2TP). L2TP is a tunneling protocol used to support virtual private networks (VPNs) but does not provide encryption or confidentiality by itself. However, L2TP typically relies on an encryption protocol that it passes within tunnel 419 to provide privacy. Although L2TP acts like a data link layer 2 protocol (corresponding to the OSI model), L2TP is really a session layer 5 protocol. The entire L2TP packet, including payload and L2TP header, is sent within a UDP datagram. L2TP can support Point-to-Point Protocol (PPP) sessions (e.g., sessions 423 and 425) within L2TP tunnel 419.

IPsec can be used to secure L2TP packets by providing confidentiality, authentication, and integrity. The combination of these two protocols is generally known as L2TP/IPsec and is standardized in IETF RFC 3193. When the tunneling process is completed, L2TP packets between the endpoints are encapsulated by IPsec. Since the L2TP packet itself is wrapped and hidden within the IPsec packet, no information about the internal private network can be obtained from the encrypted packet.

L2TP with IPSec may be used to make a VPN connection between a local network device (e.g., device 415 or 417) and media server 409 that resides in media server 401. Media server 409 may be hosted in the regional network and may be routable from CMTS 303 (as shown in FIG. 3). Media server 409 assists in routing regional traffic (e.g., VOD or Fancast video) to the local network 403, thus providing a personalized network-based server to each household.

The two endpoints of an L2TP tunnel (corresponding to 409 and 411) are called the LAC (L2TP Access Concentrator) and the LNS (L2TP Network Server). The LAC is the initiator of the tunnel, while the LNS is the server, which waits for new tunnels. Once a tunnel is established, the network traffic (e.g., sessions 423 and 425) between the peers is bidirectional. Either the LAC or LNS may initiate sessions 423 and 425. L2TP tunnel 419 may extend across an entire PPP session or only across one segment of a two-segment session.

Media servers 407 and 409 support a personalized server part of the local network, but are hosted in the provider network cloud, thus providing personalized services to the user. Once the tunnel is created, the local network traffic may be routed to the upstream server. Network server 401, which is located in the service provider's network, can establish a connection for each private network through a tunnel. Network server 401 connects to multiple households, but appears as one virtual server (e.g., media servers 407 and 409) for each of the private networks.

Embodiments may also utilize a secure shell (SSH) tunneling protocol to establish tunnel 419. An SSH tunnel is an encrypted tunnel created through an SSH protocol connection. SSH tunnels may be used to tunnel unencrypted traffic over a network through an encrypted channel. To create an SSH tunnel, an SSH client is configured to forward a specified local port to a port on the remote machine. Once the SSH tunnel has been established, the user can connect to the specified local port to access the network service.

Figure 5:
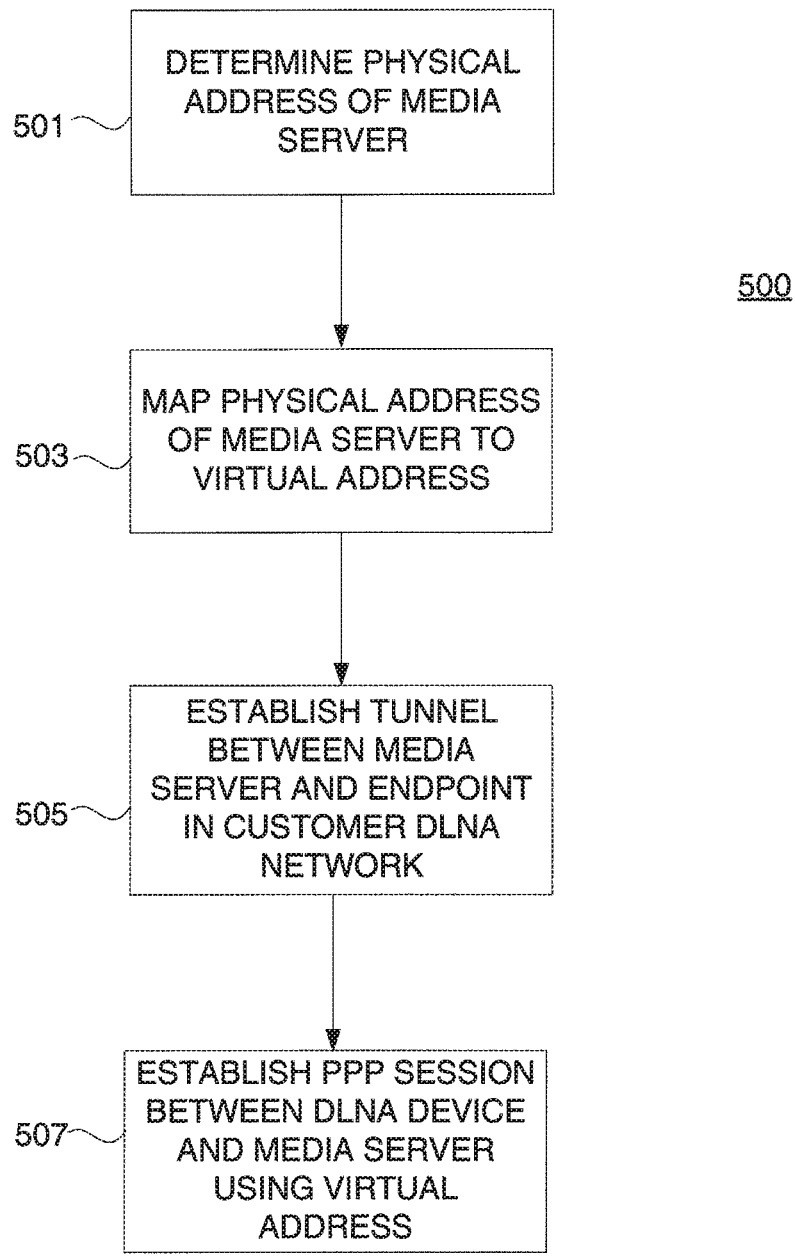
FIG. 5 shows a flow diagram that supports tunneling in accordance with aspects of the disclosure.

FIG. 5 shows a flow diagram 500 that supports tunneling in accordance with aspects of the disclosure. In step 501, the physical address of media server 409 is determined so that tunnel 419 can be established between endpoint 411 (e.g., cable modem 305, local network router 307, or PC 309 as shown in FIG. 3) and media server 409 in step 505. With some embodiments, tunnel 419 is established between arbitrary physical addresses, and then the virtual address is assigned from router 307 to media server 409 across the tunnel 419. In this way, it appears that media server 409 (from the perspective of the router and the player) is on the local network.

In step 503, the physical address of media server 409 is mapped to a virtual address so that the virtual address appears as a local address within DLNA network 403. The address mapping is performed by processor 201 (as shown in FIG. 2), which may be located in network server 401. With some embodiments, the mapping of local addresses is a function of L2TP, where all layer 2 traffic is carried across this link. The L2TP endpoint in the network may be common to all virtual sessions and may then assign a virtual server to the session. A tunnel is established in step 505 so that a session may be established to media server 409 from a DLNA device (e.g., 415 or 417). Consequently, media server 409 is treated as a local device within DLNA network 403 in step 507.

Figure 6:
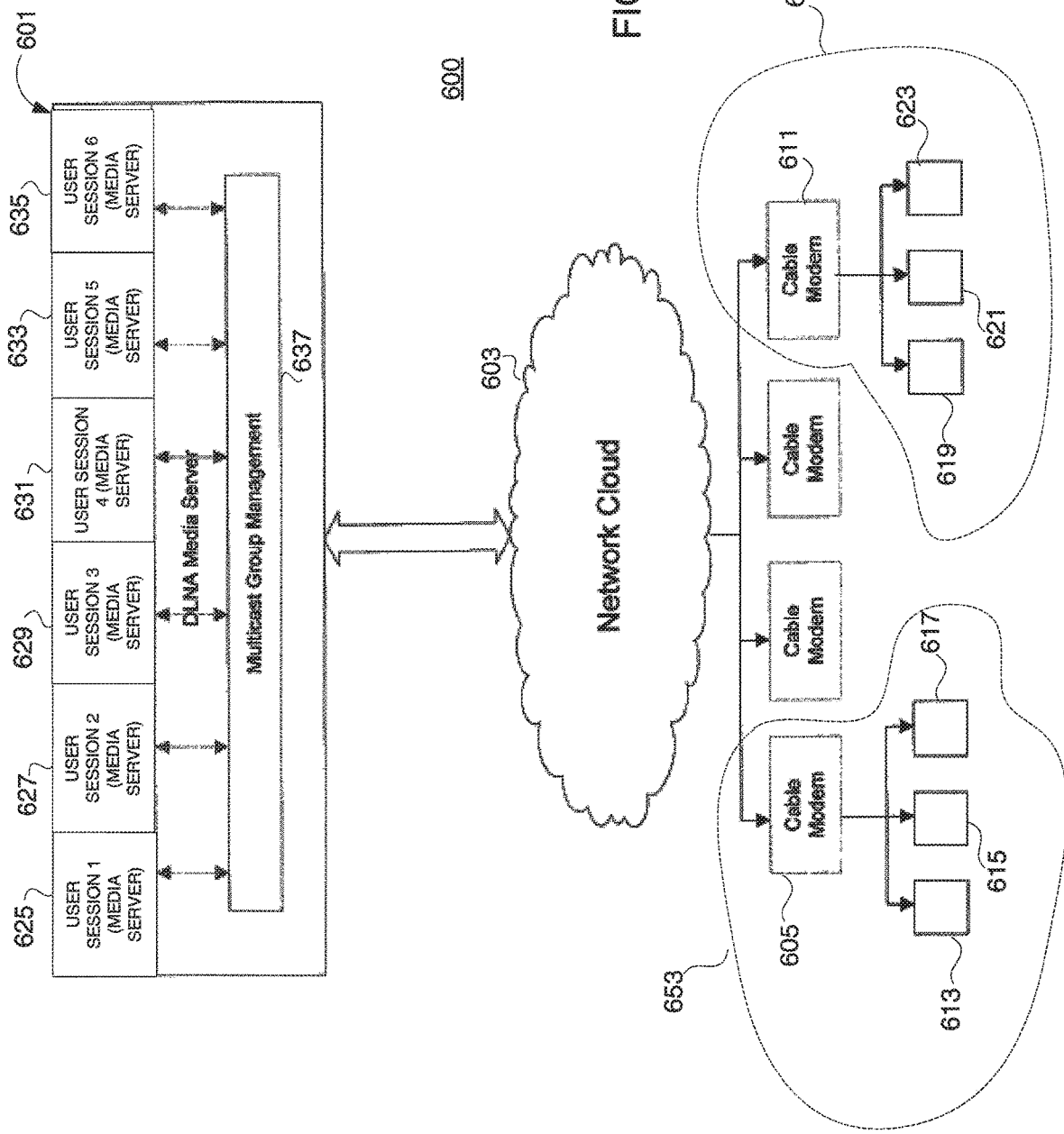
FIG. 6 shows multicast media group management for media content sharing in accordance with various aspects of the disclosure.

FIG. 6 shows a system 600 that supports multicast media group management for media content sharing in accordance with various aspects of the disclosure. Network-based media servers 625, 627, 629, 631, 633, and 635 that are implemented on server platform (network server) 601 share personalized media content for a multicast group using a network-based media server. Each user (corresponding to a media server (user session)) is able to store personalized media content. The media content may be shared with other users by making each user's media available through a multicast group. Moreover, users may subscribe to multiple media multicast groups. This approach consequently provides seamless content sharing across users through the network-based service.

A multicast group address can be used by sources and receivers to send and receive content. Sources use the multicast group address as the destination address in data packets. Receivers use the group address to inform the network that they are interested in receiving packets sent to that group. For example, if some content is associated with group address 239.1.1.1, the source sends data packets destined to 239.1.1.1. Receivers for that content inform the network that they are interested in receiving data packets sent to the group address 239.1.1.1. The receiver consequently "joins" group address 239.1.1.1. With some embodiments, it is up to the media server 107 to join a multicast group and send it down "unicast" to each DLNA client. Virtual IP address ranges may absolutely overlap. For example it is possible that all virtual addresses may be in the 192.168.0.x range.

System 600 connects DLNA networks 651 and 653 to an associated media server (625, 627, 629, 631, 633, or 635) through network 603, which comprises a service provider's infrastructure. DLNA network 651 comprises cable modem 611 and devices 619, 621, and 623 while DLNA network 653 comprises cable modem 605 and devices 613, 615, and 617. DLNA networks 651 and 653 may also include a local network router (not shown in FIG. 6).

With traditional systems, media content is shared by copying the media content to various portable devices such as DVDs, SD cards, and so forth. There may be a number of difficulties with conventional solutions. First, media content may be stored in the Internet and may not be secure enough. Also, playing media content on other media players (e.g., TVs and PMPs) typically requires more hardware or software support in the home because it requires a local DLNA media server in the home. Traditional approaches may also require that transcoding of media content to other formats be performed in the local network. Moreover, when using physical media for sharing, the media content typically needs to be copied to a physical storage device each time to share with each user. This may increase the cost to the user and may require supporting variety of physical storage devices.

With some embodiments, multicast group management function 637 shares personalized media stored in the provider's network with other users. Multicast group management function 637 may be performed by processor 201 as shown in FIG. 2. As previously discussed, tunneling with a DLNA network (e.g., DLNA network 651 or 653) enables a media server to appear as part of the DLNA network and enables media content from each user to be annunciated in a multicast group, which can be subscribed to by the other user. A user may join to or leave from the multicast group, in which a user may dynamically subscribe or unsubscribe to other user's media. The media owner can further restrict the sharing privileges by creating restrictions on the user's media group or by rejecting the restrictions to the multicast group (media group). For example, a web services layer may be supported where content can be shared. Sharing content with other users may involve creating virtual links inside the media server to share specific files or directories.

A media server of another other user interested in the media group may join or subscribe to the multicast group. Subscribing to the multicast group may be transparent to the user (e.g., the multicast group may be provisioned by the service provider) or may require explicit action by the user (e.g., through a DLNA device in response to multicast messaging advertising the multicast group). The subscribed user's media server may show media content that is shared by another user as aggregated media content to the user's media player in the downstream network.

A user may join or leave the multicast group (media group). The media owner may restrict the media to specific users by creating restrictions on the media group or by rejecting the subscriptions to the media group. This mechanism performs in a consistent manner to Internet Group Management Protocol (IGMP) for managing multicast groups. IGMP is a communications protocol often used to manage the membership of Internet Protocol multicast groups and may be used by IP hosts and adjacent multicast routers to establish multicast group memberships. IGMP is specified by documents (e.g., RFC 1112, RFC 2236, and RFC 3376) edited by the Internet Engineering Task Force (IETF).

Figure 7:
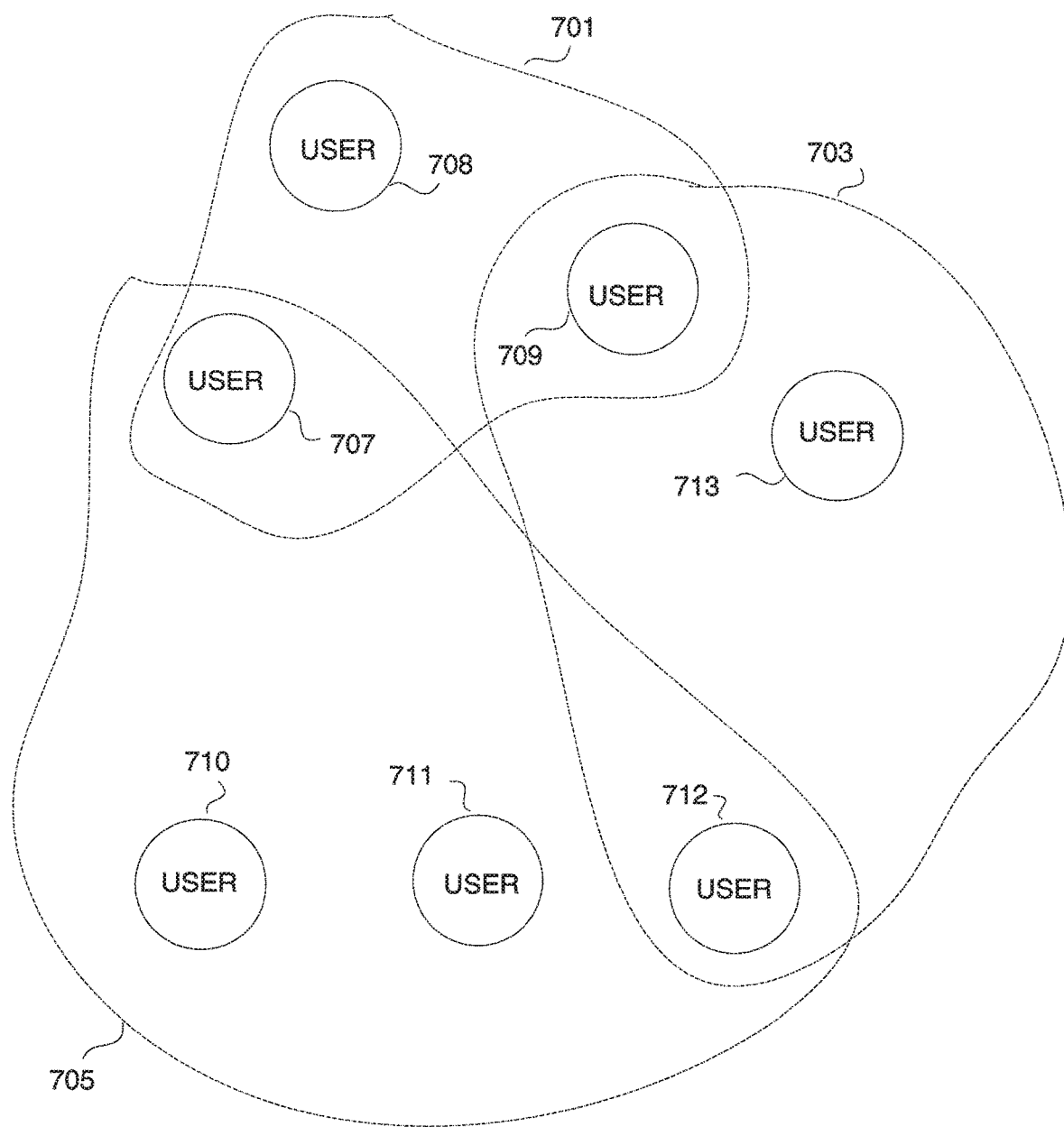
FIG. 7 shows an example of associating users with different multicast groups in accordance with various aspects of the disclosure.

FIG. 7 shows an example of associating users 707-713 with different multicast groups 701, 703, and 705 in accordance with various aspects of the disclosure. A user (corresponding to a media server) may be a member of one or more multicast groups. As exemplified by FIG. 7, user 707 is member of multicast groups 701 and 705, where each multicast group may have different restrictions. For example, multicast group 701 may include only family members while multicast group 705 may include friends. Consequently, user 707 may wish to share more personalized media (e.g., personal pictures) with members of multicast group 701 than with multicast group 705.

Figure 8:
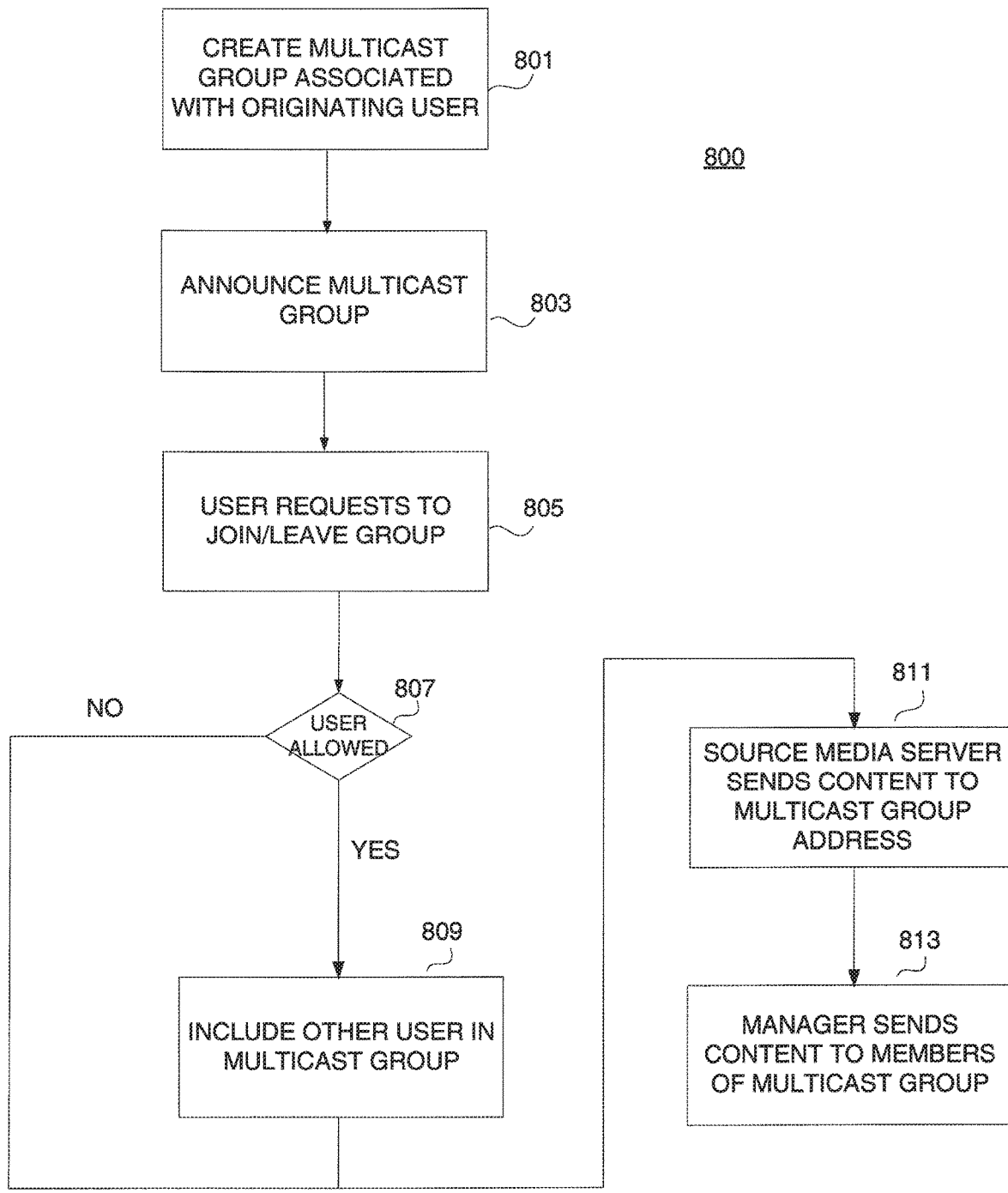
FIG. 8 shows a flow diagram for forming a multicast group in accordance with various aspects of the disclosure.

FIG. 8 shows a flow diagram 800 that supports sharing of media content using multicast groups in accordance with various aspects of the disclosure. In step 801, a multicast group is created based on one of the users supported on network server 601 (as shown in FIG. 6). Creation of the multicast group may be performed implicitly by a provisioning process or may be performed in an explicit manner, in which multicast messages are sent to selected DLNA networks so that users can discover available multicast groups and may request to join a multicast group.

In step 803, the multicast group is announced to different users so that a user can request to join the group in step 805. With some embodiments, the user may explicitly discover and request membership in the multicast group by receiving messages from multicast group management function 637. With other embodiments, multicast group management function 637 may directly manage multicast membership when all of the members are supported by media servers on network server 601 without direct participation by the users in the local networks.

In step 805, a user requests to join or leave the multicast group. Multicast group management function 637 may act on behalf of the users based on provisioning information. If the user is permitted to join the multicast group, as determined in step 807, the requesting user is added to the multicast group in step 809, and a message for the multicast group is sent to the user (e.g., the associated DLNA network if the user is explicitly involved) or to the associated media server (if multicast group management function 637 is handling multicasting on behalf of the user).

In step 811, one of the members (corresponding to the source media server) may share media content by sending the media content to the multicast group address. Consequently, in step 813 multicast group management function 637 sends the shared media content to the media servers that are associated with the multicast group.

A virtual address in a DLNA network may be converted into a multicast group address so that the multicast group appears to be local to the DLNA network by multicast group management function 637 based on provisioning of the multicast groups.

Figure 9:
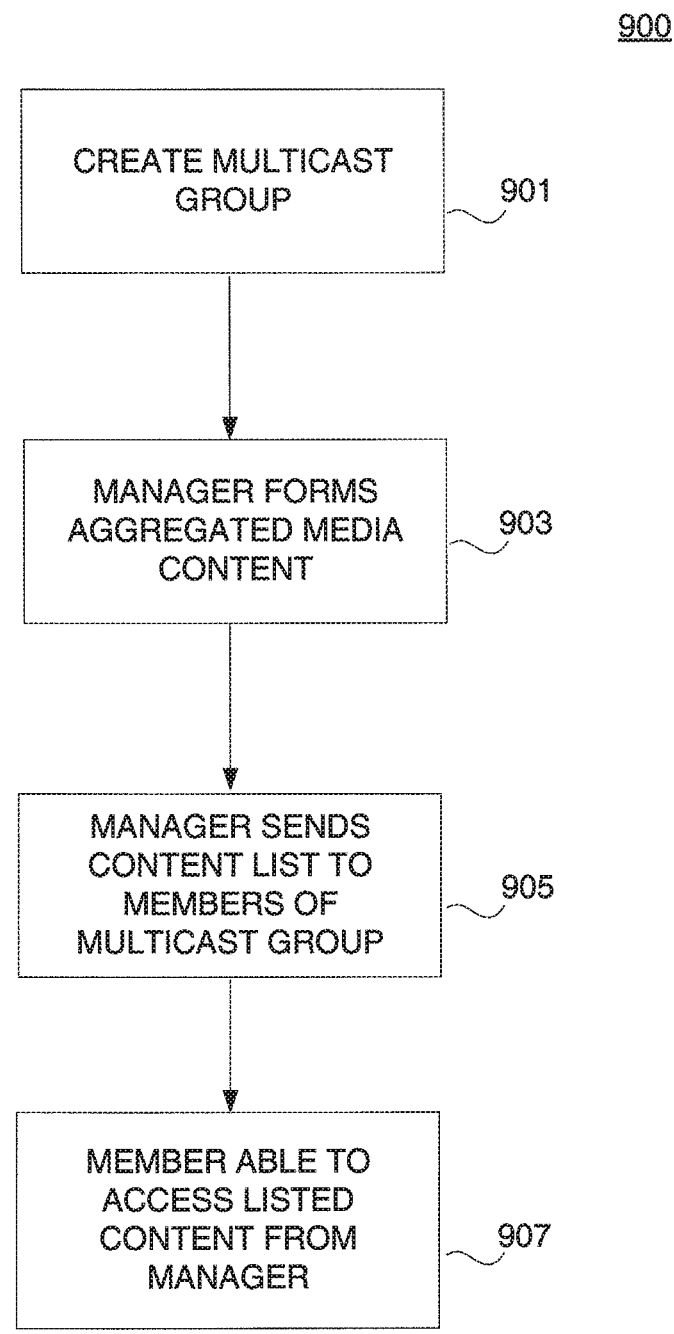
FIG. 9 shows a flow diagram that supports content messaging in accordance with various aspects of the disclosure.

FIG. 9 shows a flow diagram 900 that supports sharing of media content using multicast groups in accordance with various aspects of the disclosure. In step 901, a multicast group may be created (corresponding to steps 801, 803, 805, 807, and 809 as shown in FIG. 8). Flow diagram 900 is based on flow diagram 800 and further aggregates (combines) content media content that can be shared among the members of the multicast group. Based on media restrictions for the multicast group (e.g., from provisioning information for the multicast group), multicast group management function 637 forms the aggregated media content with shared media content for the multicast group in step 903. Media content may be aggregated based on characteristics of media content. For example, members of a multicast group may not wish to share family pictures with the other members. With some embodiments, a Web application may be supported that allows users to self-classify media and the permissions surrounding that media. Rather than duplicating media content, multicast group management 637 may use pointers that address corresponding media content for a plurality of users.

In step 905, multicast group management function 637 may send the content list of aggregated media content to the members of the multicast group. Subsequently, a member can select available media content from multicast group management function 637. With some embodiments, content annunciation happens through the multicast address, while the request and access of actual content happens through the virtual IP address and not through the multicast address.

With some embodiments, sharing of content may be accomplished through the use of one or more capabilities associated with the virtual machines in the network. Capabilities include:

Content to be shared is made available from one virtual machine to another via a copy or link of the asset to the virtual machine associated with the party to which the content is to be shared. In this case, the virtual server associated with the party with which the content is to be shared references a copy of the media directly or indirectly through a symbolic link.

The party with whom the media is to be shared should contact the sharing party's virtual server directly and request the content.

A third party server (e.g., a RADIUS server) should control access to each asset associated with any virtual machine in the network. However, regardless of which implementation, there is typically a need for authentication and access control only to allow authorized parties to specific assets.

Figure 10:
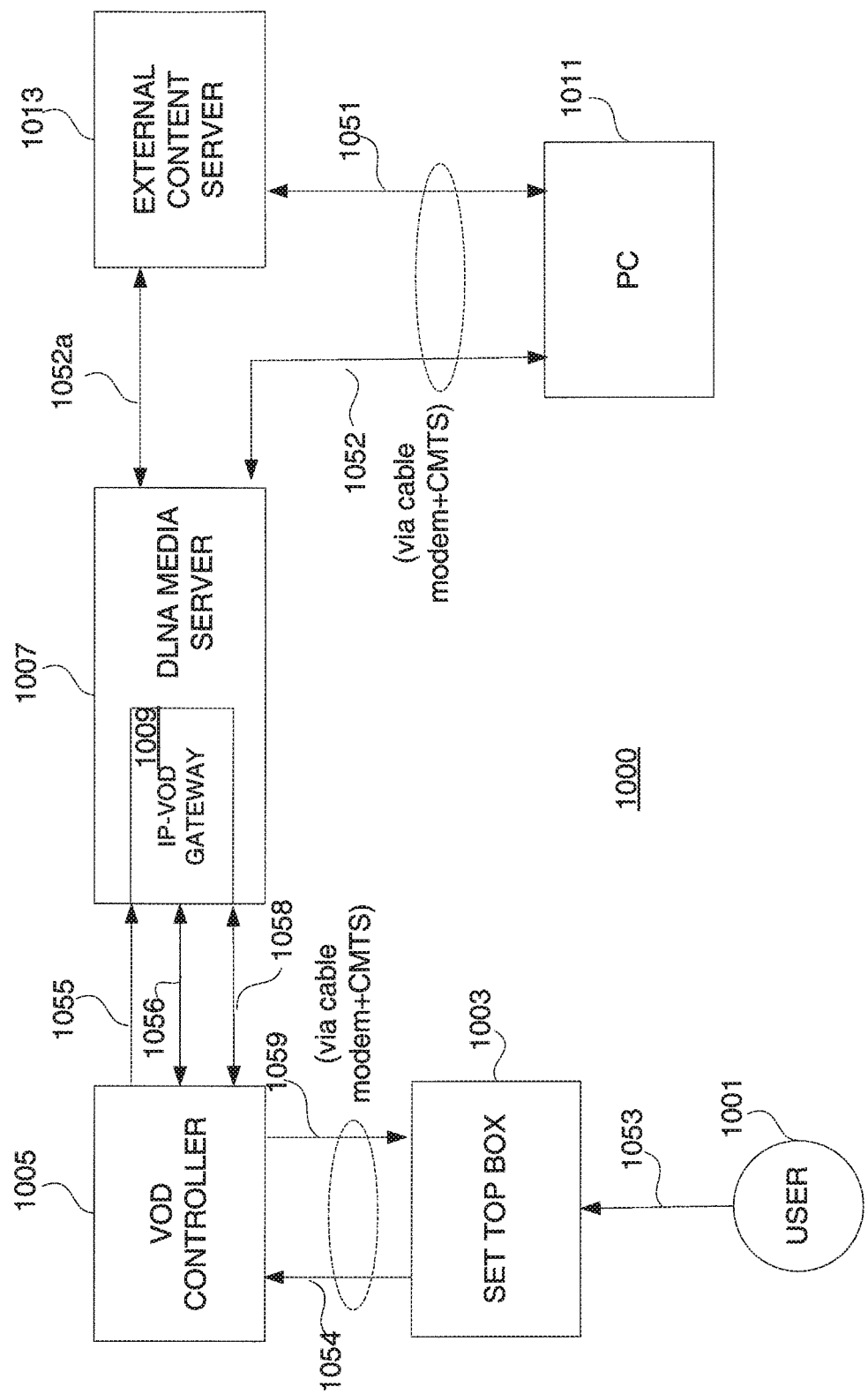
FIG. 10 illustrates an Internet Protocol (IP) to Video On Demand (VOD) gateway in accordance with various aspects of the disclosure.

FIG. 10 illustrates an Internet Protocol (IP) to Video VOD gateway in accordance with various aspects of the disclosure. System 1000 includes a VOD server (e.g., server 115 but not explicitly shown in FIG. 10) through VOD controller 1005 to support an IP to VOD gateway residing on a DLNA media server 1007. Media server 1007 may include a function to distribute media content to IP enabled media players (e.g., PC 1011) and to set top box 1003.

In an exemplary embodiment, media content may be from any of the three sources from a service provider network: Internet media server 113, VOD server 115, or personalized media store 111 as shown in FIG. 1. With some embodiments, DLNA media server 1007 supports the following functionalities:

Session management of VOD controller 1005.
Authentication for each session.
Transcoding of media content.
Connectivity to Personalized Media Store (not explicitly shown in FIG. 10 but corresponding to 111 as shown in FIG. 1).
Connectivity to External Content Server 1013.
Aggregate and display VOD assets to an IP based media player 1011 (also shown as PC 1011).
Mapping DRM of VOD and IP assets.

IP-based content may be transcoded by DLNA media server 1007 to reformat the content for the correct display size with the correct frame rate for the end equipment displaying the VOD asset. In addition, DLNA media server 1007 handles transcription and digital rights management rules. DRM rules often apply to original content and that need to be mapped to reformatted content. For example, the rules that apply to Windows Media® digital rights management (DRM) should be mapped to the corresponding VOD asset so that a television understands the DRM rules when paying the VOD asset. In addition to digital rights management, DLNA media server 1007 may handle the business rules (e.g., rental, purchase, how many devices and which devices) and personal rules associated with profile management for the content. For example, content may be viewable only by authorized recipients.

System 1000 may utilize features of VOD controller 1005, including managing a session with network-based DLNA media server 1007 through IP-VOD gateway 1009, transferring the personalized media content from the DLNA media server 1007 to set top box 1003 on an in-band channel, rendering content media from DLNA media server 1007 as a VOD asset, and announcing the VOD assets to DLNA media server 1007 for selection by user 1001. As used herein, the term "set top box" is used to describe an apparatus that is configured to navigate, select, receive and provide an output of multimedia content from a provider such as a broadcast, unicast, multicast, and/or video on demand, Internet, private network, or other provider (hereinafter content provider). The content provider may include a cable system, satellite system, fiber optic system, telephone system, mobile car TV system, phone TV system, power system, or other system associated with providing content navigation, selection and distribution services to a user (including business) location. Moreover, a set top box is not required to be a separate apparatus, but rather would encompass a television and/or DVR configurable to receive the media content. Indeed, any device that is configurable to receive and provide an output signal comprising media content from a broadcast provider falls within the term set top box as used herein. The apparatus(es) that form the set top box may include one or more processors, ASICs, memories, user interfaces, and other features to facilitate the operation thereof. An apparatus may interact with other delivery or control platforms to navigate, select, and receive content. Content may include data, applications, broadcast media, on demand media, and combinations thereof.

The DLNA media server with IP to VOD gateway may offer advantages over traditional systems. For example, system 1000 may provide accessibility of media across domain boundaries so that user 1001 can host personal media content such as photos, videos in the service provider network and can watch the media content on a television or other media player. Consequently, a separate digital media server (DMS) may not be needed at the customer premise, thus facilitating management of the DLNA network by the user. In addition, transcoding of content media and mapping of DRM can be performed by media server 1007 at the network level, and consequently the user would not need the associated applications in an entity on the customer premise. A non-technical user also may be able to easily play the personalized media from an IP network to a television. It also may be possible to share personal media with other users or subscribe to another user's content (such as photos, videos) with appropriate permissions and DRM.

Figure 11:
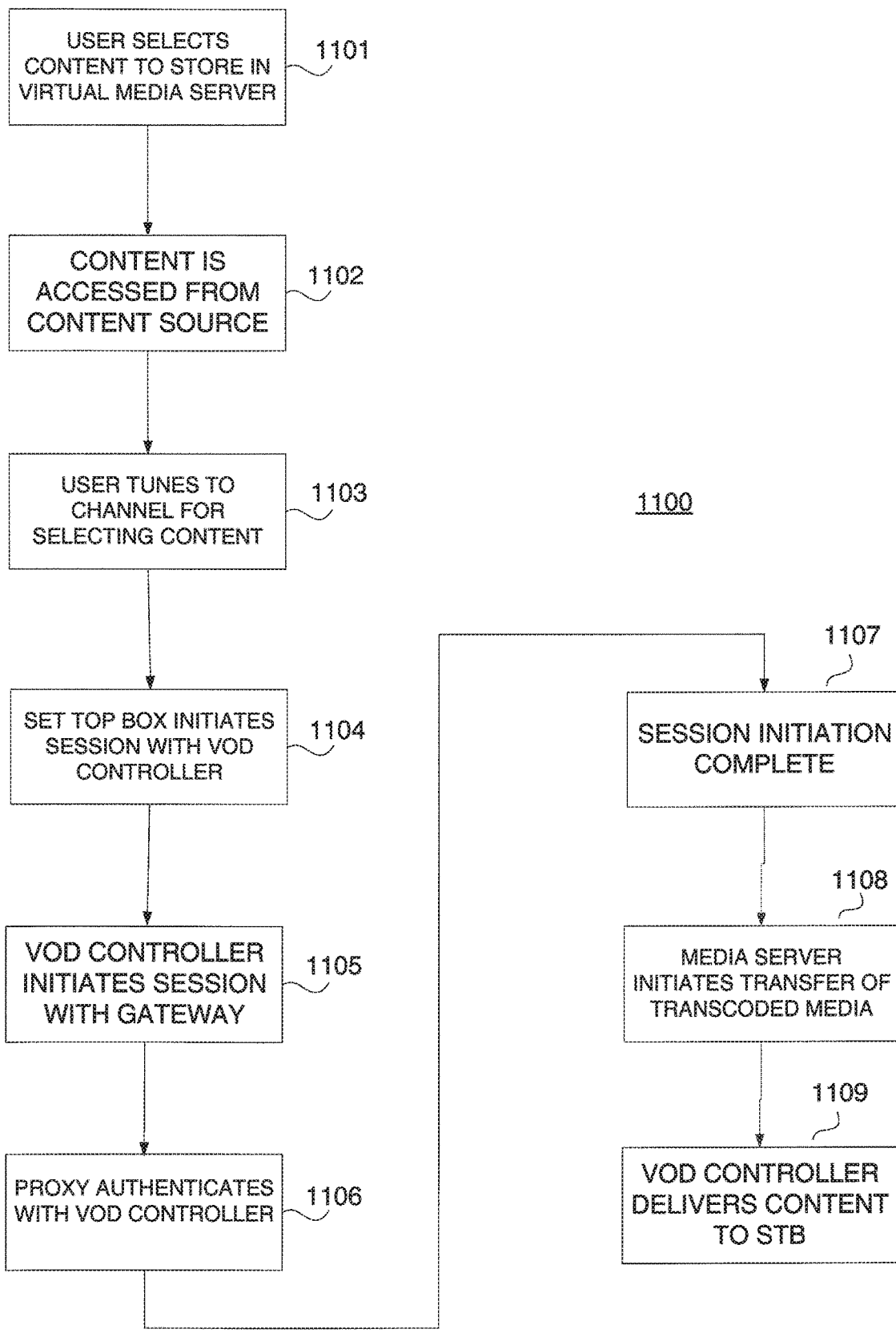
FIG. 11 shows a flow diagram for supporting IP to VOD gateway, as illustrated in FIG. 10, in accordance with various aspects of the disclosure.

FIG. 11 shows flow diagram 1100 for an exemplary method of supporting an IP to VOD gateway, as illustrated in FIG. 10, in accordance with various aspects of the disclosure. Flow diagram 1100 enables IP content media to be played on set top box 1003 as a VOD asset by delivering the media content from DLNA media server 1007 as a VOD asset to set top box 1003. User 1001 may instruct set top box 1003 to tune to a specific VOD channel, and VOD controller 1005 initiates a session with DLNA media server 1007 in order to stream the specific user's media content. Yet in other embodiments, upon selection of a specific media content, the set top box 1003 may automatically tune to a specific VOD channel, and VOD controller 1005 may then initiate a session with DLNA media server 1007 in order to stream the specific user's media content.

DLNA media server 1007 may perform transcoding (e.g., MPEG 2 format) in order to obtain a compatible format for set top box 1003. For example, a VOD asset typically has a MPEG-2 format while IP-based media content may have one of different formats including MPEG-2, MPEG-4, H.264, and H.263. Session management that is established between VOD controller 1005, and DLNA media server 1007 may use existing VOD protocols, e.g., Session Setup Protocol, Stream Control Protocol, and Autodiscovery. Referring FIG. 11, user 1001 chooses the media content to store in DLNA media server 1007 (virtual DLNA media server (DMS) in step 1101 corresponding to messaging 1051 as shown in FIG. 10. Consequently, in accordance with an exemplary embodiment, media content is stored in DLNA media server 1007 from user's PC 1011 in step 1102 (corresponding to messaging 1052). With another exemplary embodiment, subscribed media content from external content server 1013 (e.g., Fancast @fancast.com or YouTube @youtube.com) or aggregated media content from external content server 1013 may be stored on DLNA media server 1007 corresponding to messaging 1052a.

In step 1103 (corresponding to messaging 1053), user 1001 tunes set top box 1003 to a channel for selecting content stored in DLNA media server 1007. In step 1104 (corresponding to messaging 1054), set top box 1003 initiates a session with VOD controller 1005. Consequently, in step 1105 (corresponding to messaging 1055) VOD controller 1005 initiates a session with the gateway 1009 that may be executed on DLNA media server 1007.

In step 1106 (corresponding to messaging 1056), DLNA media server 1007 authenticates with VOD controller 1005 for initiating the user session. In step 1107 (corresponding to messaging 1057), the session initiation is completed In step 1108 (corresponding to messaging 1058), DLNA media server 1007 initiates transfer of the transcoded media content to set top box 1003. In step 1109 (corresponding to signal flow 1059), VOD controller 1005 uses the VOD infrastructure for delivering the media content to set top box 1003. Set top box 1003 consequently renders the media content to a connected player (not explicitly shown in FIG. 11).

Figure 12:
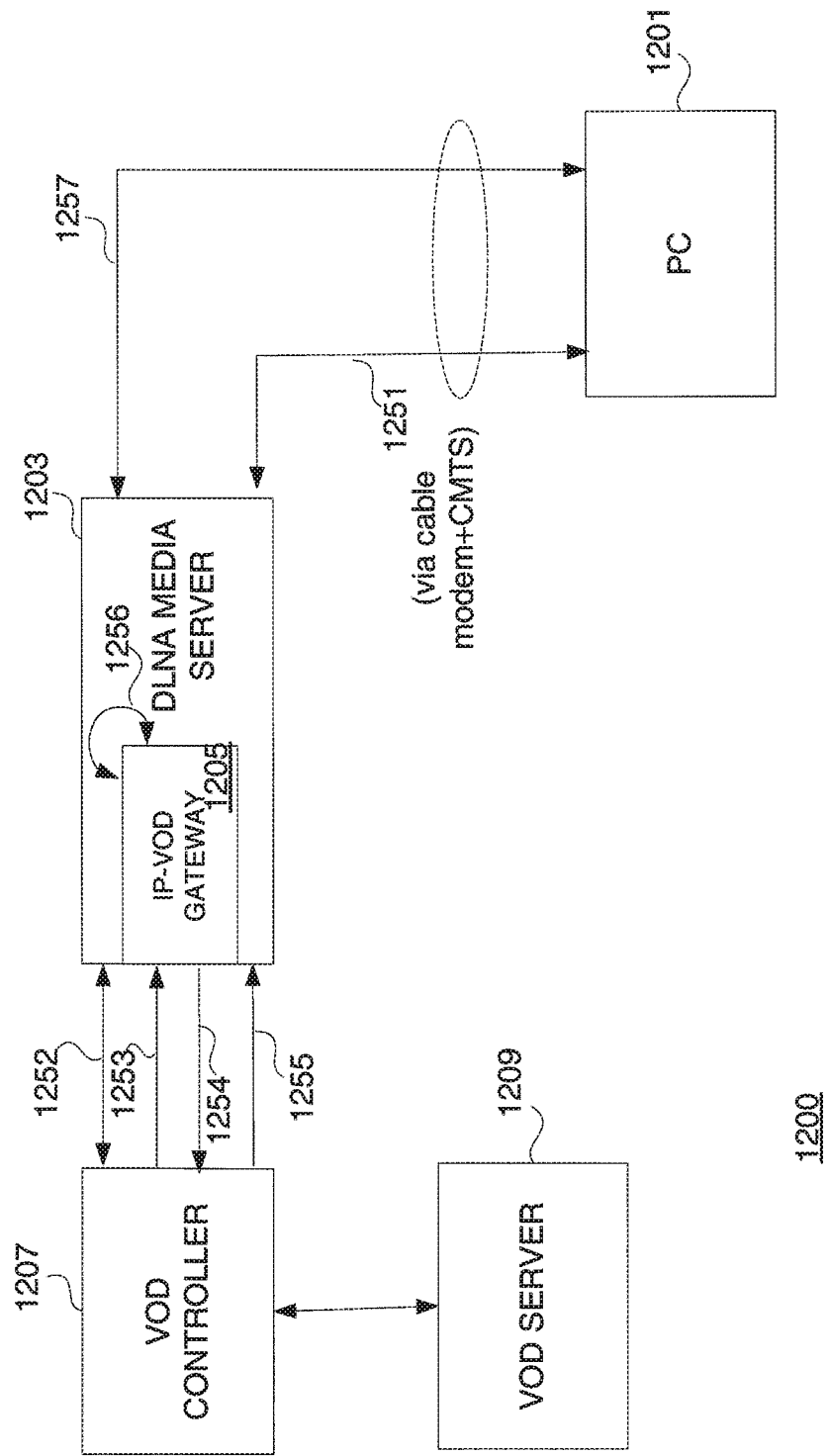
FIG. 12 shows a system in which a VOD asset is played on an IP-based media player in accordance with various aspects of the disclosure.

FIG. 12 shows system 1200 in which a VOD asset is played on an IP-based media player in accordance with various aspects of the disclosure. System 1200 is an inverse version of system 1000 as shown in FIG. 10. System 1000 enables IP-based media content to be played through set top box 1003 as a VOD asset, while system 1200 enables a VOD asset to be played on an IP-based media player (e.g., PC 1201).

DLNA media server proxy 1203 aggregates a VOD asset and provides a user interface to an application running on the media player 1201 (also shown as PC 1201 but may be a separate media player in some embodiments). The user selects a VOD asset using this application. IP-VOD gateway 1205 (which may be implemented on media server 1203) initiates a session with the VOD system and requests the VOD asset from VOD server 1209 through VOD controller 1207. DLNA media server 1203 transcodes the received media to the appropriate format for PC 1201, applies usage rules and DRM to the media content, and transfers the transcoded media content to PC 1201 downstream via the IP network.

Figure 13:
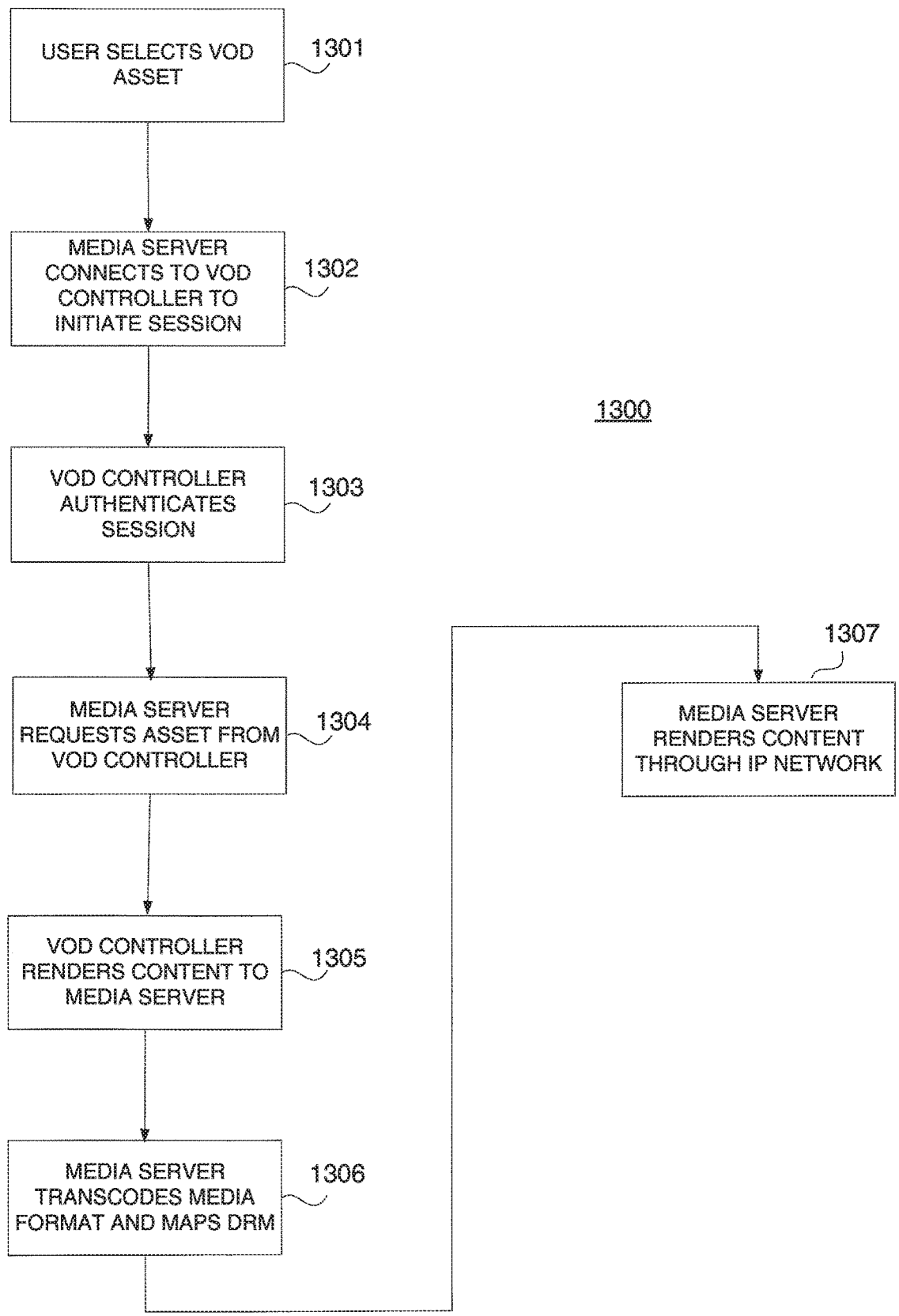
FIG. 13 shows a flow diagram for playing a VOD asset on an IP-based media player in accordance with various aspects of the disclosure.

FIG. 13 shows flow diagram 1300 for system 1200 in which a VOD asset is played on an IP-based media player 1201 in accordance with various aspects of the disclosure. In step 1301 (corresponding to flow 1251 as shown in FIG. 4) a user chooses a VOD asset from a list displayed on PC 1201 in the desktop application. Typically, the list is dynamically populated by DLNA media server 1203.

In step 1302 (corresponding to flow 1252) DLNA media server 1203 connects to VOD controller 1207 to initiate a session with the user credentials. In step 1303 (corresponding to flow 1253) VOD controller 1207 authenticates the session.

Once the session has been established in steps 1302 and 1303, DLNA media server 1203 requests the asset from VOD controller 1207 in step 1304 (corresponding to flow 1254). VOD controller 1207 consequently renders the requested media content to DLNA media server 1203 in step 1305 (corresponding to flow 1255).

In step 1306 (corresponding to flow 1256) DLNA media server 1203 transcodes the media format and maps the DRM of the requested VOD asset to the corresponding DRM (e.g., Windows Media DRM or Content Protection for Recordable Media and Pre-Recorded Media (CPRM/CPPM)). In step 1307 (corresponding to flow 1257) DLNA media server 1203 renders the transcoded media content through the IP network to PC 1201.

While the exemplary embodiments have been discussed in broad terms of a cable communications networking environment, some embodiments may be configured for other networking environments including telecommunications environments.

We claim:

1. A method comprising:
    receiving a first indication of a first communication channel associated with a first Digital Living Network Alliance (DLNA) network comprising a first computing device and a first DLNA device;
    receiving a second indication of a second communication channel associated with a second DLNA network comprising a second computing device, wherein the second DLNA network is different than the first DLNA network;
    receiving, via the second communication channel:
        an indication of a content item stored in one or more devices of the second DLNA network, and
        sharing privileges which specify one or more groups that are permitted to retrieve the content item via the second DLNA network, wherein each of the one or more groups comprises one or more users;
    receiving, via the first communication channel and from the first DLNA device, a request for the content item; and
    based on determining that a first user of the first DLNA device is part of at least one of the one or more groups that are permitted to retrieve the content item via the second DLNA network, causing transmission, via the first computing device, of the content item from the second DLNA network to the first DLNA network.

2. The method of claim 1, further comprising:
causing presentation of a virtual address via the first DLNA network, wherein the request for the content item is addressed to the virtual address.

3. The method of claim 2, wherein causing presentation of the virtual address comprises causing presentation, via the first DLNA network, of a third indication of a DLNA storage device storing the content item.

4. The method of claim 1, wherein the request for the content item is received via the second computing device.

5. The method of claim 1, wherein the second computing device is addressable on the first DLNA network.

6. The method of claim 1, wherein receiving the indication of the content item is in response to a second user sharing the content item via a multicast group address.

7. The method of claim 6, wherein the sharing privileges are associated with the second user.

8. The method of claim 1, further comprising:
subscribing the first user to the at least one of the one or more groups.

9. A method comprising:
receiving a first indication of a first communication channel between a first computing device and a first Digital Living Network Alliance (DLNA) device in a first DLNA network;
receiving a second indication of a second communication channel associated with a second DLNA network comprising a second DLNA device, wherein the second DLNA network is different than the first DLNA network;
receiving, by the first computing device and from the first DLNA device, a content item;
storing, by the first computing device, the content item in a storage area associated with a user of the first DLNA device;
receiving, from the second DLNA device, a request for the content item;
based on determining that a second user, of the second DLNA device, is part of one or more groups permitted to retrieve the content item from the first computing device and via the first DLNA network:
transcoding the content item from a first format to a second format compatible with the second DLNA device; and
sending, by the first computing device and to the second DLNA network, the transcoded content item.

10. The method of claim 9, wherein determining that the second user of the second DLNA device is part of the at least one of the one or more groups that are permitted to retrieve the content item from the first computing device and via the first DLNA network comprises subscribing the second user to the at least one of the one or more groups.

11. The method of claim 9, wherein the first computing device is addressable on the second DLNA network.

12. The method of claim 9, wherein a first endpoint in the first DLNA network has a first public address on a public network, and wherein the first endpoint maps the first public address to a plurality of private addresses on the first DLNA network through network address translation.

13. The method of claim 12, wherein a second endpoint in the second DLNA network has a second public address on the public network, and wherein the second endpoint maps the second public address to a second plurality of private addresses on the second DLNA network through network address translation.

14. The method of claim 12, wherein the first computing device is addressable on the public network.

15. A method comprising:
receiving a first indication of a first communication channel associated with a first Digital Living Network Alliance (DLNA) network comprising a first DLNA device;
receiving a second indication of a second communication channel associated with a second DLNA network comprising a second computing device and a second DLNA device;
receiving, from the second computing device and via the second communication channel, a content item;
storing the content item in a storage area associated with a second user of the second DLNA device;
receiving, from the first DLNA device and via the first communication channel, a request for the content item, wherein the request is associated with a first user of the first DLNA device; and
based on determining that the first user of the first DLNA device is part of at least one of one or more groups that are permitted to retrieve the content item from the storage area and via the second DLNA network, sending, to the first DLNA device and based on the determining, the content item.

16. The method of claim 15, further comprising:
receiving, from a first computing device associated with the first DLNA network, a second content item; and
storing the second content item in a second storage area associated with the first user.

17. The method of claim 15, wherein storing the content item in the storage area comprises causing presentation of a multicast group address.

18. The method of claim 15, wherein an endpoint in the second DLNA network comprises one or more of a cable modem or a local area network router.

19. The method of claim 18, wherein a first computing device is addressable on the first DLNA network, wherein the second computing device is addressable on the second DLNA network, and wherein the first computing device and the second computing device are addressable on a third private network.

20. The method of claim 15, wherein a first endpoint in the first DLNA network has a first public address on a public network, wherein the first endpoint maps the first public address to a first plurality of private addresses on the first DLNA network through network address translation, wherein a second endpoint in the second DLNA network has a second public address on the public network, and wherein the second endpoint maps the second public address to a second plurality of private addresses on the second DLNA network through network address translation.

* * * * *

UNITED STATES PATENT AND TRADEMARK OFFICE
CERTIFICATE OF CORRECTION

| | | |
|---|---|---|
| PATENT NO. | : 11,082,745 B2 | Page 1 of 1 |
| APPLICATION NO. | : 16/453002 | |
| DATED | : August 3, 2021 | |
| INVENTOR(S) | : Poder et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 22 days.

Signed and Sealed this
Seventh Day of February, 2023

Katherine Kelly Vidal
*Director of the United States Patent and Trademark Office*